US007688601B2

(12) United States Patent
Bögel

(10) Patent No.: US 7,688,601 B2
(45) Date of Patent: Mar. 30, 2010

(54) METHOD AND ARRANGEMENT FOR THE POWER SUPPLY OF AN INDUCTION HEATING DEVICE

(75) Inventor: Jörg Bögel, Oberderdingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 0 days.

(21) Appl. No.: 12/392,147

(22) Filed: Feb. 25, 2009

(65) Prior Publication Data

US 2009/0160413 A1 Jun. 25, 2009

Related U.S. Application Data

(63) Continuation of application No. PCT/EP2007/007350, filed on Aug. 21, 2007.

(30) Foreign Application Priority Data

Aug. 25, 2006 (DE) ...................... 10 2006 041 964

(51) Int. Cl.
*H02M 3/335* (2006.01)

(52) U.S. Cl. ...................................................... 363/17

(58) Field of Classification Search .................. 363/17, 363/40, 41, 56.02, 132
See application file for complete search history.

(56) References Cited

U.S. PATENT DOCUMENTS 4,085,300 A 4/1978 MacKenzie et al.
4,275,281 A 6/1981 Kiuchi
6,528,770 B1 * 3/2003 Akel et al. .................. 219/624
2003/0205572 A1 11/2003 Bassill et al.
2004/0118832 A1 6/2004 Ryu et al.
2005/0017699 A1 * 1/2005 Stanley ....................... 323/282

FOREIGN PATENT DOCUMENTS

DE 10 2005 028829 1/2007
FR 2726704 A1 * 5/1996

OTHER PUBLICATIONS

International Search Report from PCT/EP2007/007350 dated Oct. 24, 2007.
German Search Report for German Application No. 10 2006 041 964.2.

* cited by examiner

*Primary Examiner*—Adolf Berhane
(74) *Attorney, Agent, or Firm*—Alston & Bird LLP

(57) ABSTRACT

In order to increase the power of an induction heating device or in order to avoid system reactions when driving the latter, either the pulse widths of the two switching means can be made unsymmetrical in the case of half-bridge driving up to the half-point of a half-cycle. Alternatively, a dead time between the pulse width can be extended. This advantageously takes place without interruption and continuously. In the course of a half-cycle, the power is thus reduced given an unaltered operating frequency and an inductor current has virtually an ideal sine-wave form.

13 Claims, 2 Drawing Sheets

METHOD AND ARRANGEMENT FOR THE POWER SUPPLY OF AN INDUCTION HEATING DEVICE

CROSS REFERENCE TO RELATED APPLICATIONS

This application is a continuation of PCT/EP2007/007350, filed Aug. 21, 2007, which in turn claims priority to DE 10 2006 041 964.2, filed on Aug. 25, 2006, the contents of both of which are incorporated by reference.

FIELD OF THE INVENTION

The invention relates to a method for the power supply of an induction heating device and to an arrangement for the power supply to an induction heating device.

BACKGROUND OF THE INVENTION

Such induction heating devices are, for example, used as induction coils in induction hobs. The wish is always for ever higher power levels, in particular so as to be able to rapidly carry out the boiling of larger quantities of liquid, for example, for cooking noodles.

At present there is a limit of approximately 3.2 kW, as from which the frequency converters necessary for the power supply exceed the value limits established by standards with regards to harmonics and mains supply reactions. The reason for the severe effects of harmonics and in particular the third harmonic is essentially that the permeability of the magnetic components in the frequency converter changes with the amplitude of the inductor current flowing through the induction coil. At high current amplitudes there is a drop in the permeability of ferrites and the like which are used in an induction coil for field guidance purposes, together with that of the saucepan material. This in turn leads to a change to the inductance of the induction coil during a half-wave of the supply voltage and consequently also the resonant frequency of a series resonant circuit, such as is used in the power supply. Thus, ultimately the power consumption from the mains supply is distorted and its curve diverges from the predetermined supply voltage curve.

Solutions for such induction heating devices or methods for the supply thereof are described in the not previously published DE 10 2005 028 829.4 of the same applicant, where in order to avoid supply reactions an operating frequency of the switching means or the entire frequency converter is increased and then decreased again during a half-wave. However, this operating frequency change is complicated from the control standpoint.

BRIEF DESCRIPTION OF THE DRAWINGS

Embodiments of the invention are described hereinafter relative to the attached diagrammatic drawings, wherein show.

DETAILED DESCRIPTION OF EMBODIMENTS

Figure 1:
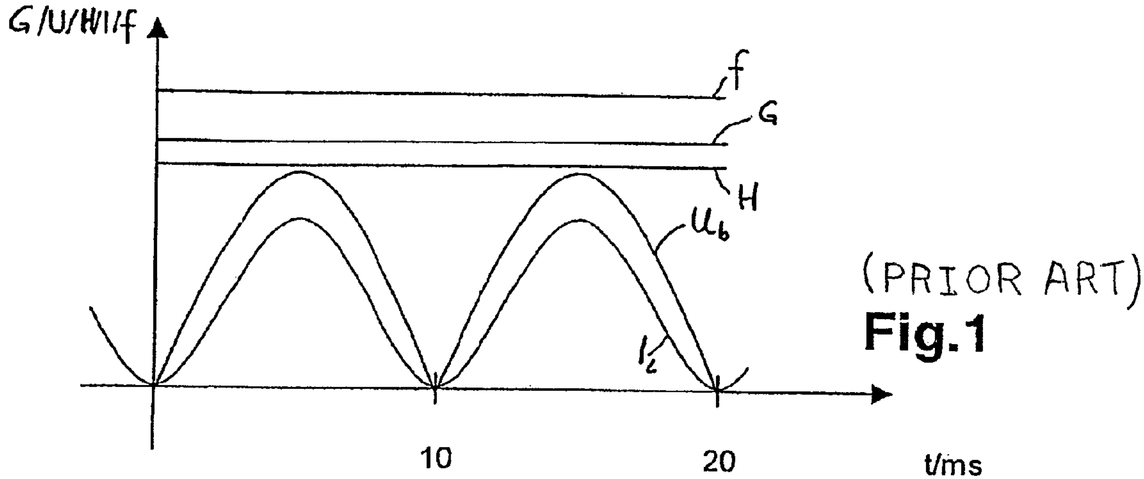
(PRIOR ART) Fig.1
FIG. 1 illustrates the curves of the impedance of the induction coil, the operating voltage, the amplitude of the inductor current, the pulse widths and the dead times over time according to the prior art.

A problem solved by the invention is to provide an aforementioned method and an arrangement suitable for the same, which makes it possible to obviate the difficulties of the prior art and in particular without modifying the operating frequency at high power levels in induction heating devices to be able to reduce mains supply reactions or distortions to the power consumption from the supply network.

This problem is solved in various embodiments by a method and arrangement as claimed herein. Advantageous and preferred developments of the invention form the subject matter of the further claims and are explained in greater detail hereinafter. Some of the subsequently mentioned features and characteristics apply both to the method and to the arrangement or the use. They are in part only described once, but independently thereof apply both to the method, the arrangement and the application or use. By express reference the wording of the claims is made into part of the content of the description.

An alternating supply voltage is used for the power supply of the induction heating device. There is also a frequency converter with switchable switching means. An operating frequency of said switching means or said frequency converter remains the same over a half-wave of the alternating supply voltage. According to one embodiment of the invention, in a first basic development of the invention, a pulse width of the control device of the switching means or the frequency converter is modified during a half-wave. This is brought about in that up to the half-time of a half-wave, a pulse width of a first switching means is made shorter and a pulse width of another, second switching means is made longer. In the second half-time of the half-wave, the pulse widths are again modified in such a way that they are again of equal length up to the end of the half-wave. Preferably the sum of the pulse widths (G1, G2) remains the same. The change can admittedly take place asymmetrically to the half-time, but advantageously there is a change to the pulse widths symmetrically relative to the half-time.

A frequency converter or the power supply for the induction heating device can have a series resonant circuit. This comprises an induction coil for power transmission, resonant circuit capacitors and a half-bridge with switchable switching means. Such series resonant circuits are fundamentally known for induction heating devices.

Thus, it is possible by changing the pulse width ratio as a function of the course of the half-wave to counteract the formation of harmonics. Thus, with the operating frequency unchanged, it is possible to reduce the power level, so that a current flowing in a resonant circuit of the power supply can be kept proportional to the alternating supply voltage. Thus, the main supply reactions are reduced and higher power levels for the induction heating device are made possible.

In an advantageous embodiment of the invention the change to the pulse widths can be 10% to 40%. With particular advantage, the pulse widths are modified by a maximum of 25%, i.e., shortened or lengthened.

In a second embodiment of the invention, in all or two of the switching means present in a series resonant circuit both pulse widths are shortened in such a way that the dead times between them are lengthened. This also takes place during the course of a half-wave and up to the half-time of the half-wave the dead times are longer and subsequently shorter again. None of the switching means is controlled during these dead times. A change to the dead times is advantageously a maximum of 100%, i.e. at the most twice the dead times between the shortest dead times and the longest dead time. With particular advantage the maximum change is somewhat below this, for example 50% to 80%.

Also, through the lengthening of the dead times between the pulses for the switching means, the power level at the induction coil can be reduced somewhat in order to reduce harmonics and therefore reduce supply reactions.

A shortening of the on-times or pulse widths of the switching means takes place in the same way as the lengthening of the dead times advantageously symmetrically to the half-time of the half-wave. This allows a uniform control and power generation.

In a further preferred embodiment of the invention, a change to a pulse width or a dead time over a mains voltage half-wave takes place very uniformly or in distributed manner. In particular, such a distribution can be such that the change to the pulse width or the dead time essentially corresponds to a sinusoidal curve shape.

In a further preferred embodiment of the invention, only one control device is provided for accomplishing a change to the on-switching times, the pulse widths or the dead times and there is no regulating device. Thus, there is no need for feedback for a regulation loop and the associated costs, in particular, the wiring costs are significantly lower.

Thus, an aforementioned arrangement has a frequency converter with a resonant circuit, which is formed from the induction coil, resonant circuit capacitors and a half-bridge with switchable switching means. There is also a control device for the switching means, the operating frequency or on-times of the switching means can be influenced. In particular, in the aforementioned manner, the pulse widths or dead times can be modified, the operating frequency can be left the same, and one pulse width is shortened or the one dead time is lengthened.

These and further features can be gathered from the claims, description and drawings and the individual features, both singly or in the form of subcombinations, can be implemented in an embodiment of the invention and in other fields and can represent advantageous, independently protectable constructions for which protection is claimed here. The subdivision of the application into individual sections and the subheadings in no way restrict the general validity of the statements made thereunder.

FIG. 1 shows for known methods the curve of the operating voltage $U_b$, impedance Z=w*L of induction coil L, inductor current $I_L$, operating frequency f of for example approximately 20 kHz, pulse width G and dead times H over time. It can be seen how in the case of a constant operating frequency f, the curve of the inductor current $I_L$ diverges from that of the operating voltage $U_b$ and it in particular diverges from a sinusoidal shape, which leads to the aforementioned negative mains supply effects.

Figure 2:
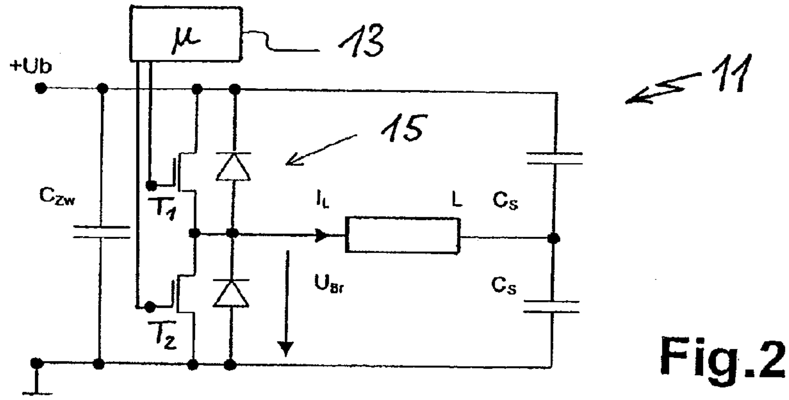
FIG. 2 illustrates a circuit diagram of a power supply arrangement for an induction coil according to one embodiment of the invention.

FIG. 2 shows one inventive arrangement or circuit arrangement 11. A control device 13 controls a frequency converter 15 with two switching means $T_1$ and $T_2$, for example transistors. They form together with an intermediate circuit capacitor $C_{zw}$ and resonant circuit capacitor $C_s$ the control device for induction coil L. By means of control device 13 in particular the operating frequency for switching means $T_1$, $T_2$ and therefore the frequency converter 15 is predetermined. Thus, also the pulse width G and dead times H are predetermined.

If the induction coil L is used in an induction heating device or a heating device for an induction hob, power levels of even higher than 3 kW or 3.2 kW are possible, for example 3.5 kW to 3.7 kW or even 4 kW. Thus, it is possible to construct stronger induction hobs for faster parboiling processes or for providing higher power levels. The costs are not particularly high for the control device of the pulse widths G and dead times H of the frequency converter 15 or the switching means $T_1$ and $T_2$. Particularly if the curves are predetermined or are predetermined controlled by a control device, the expenditure is kept within reasonable limits, because it is possible to operate with predetermined curves or gradients.

Figure 3:
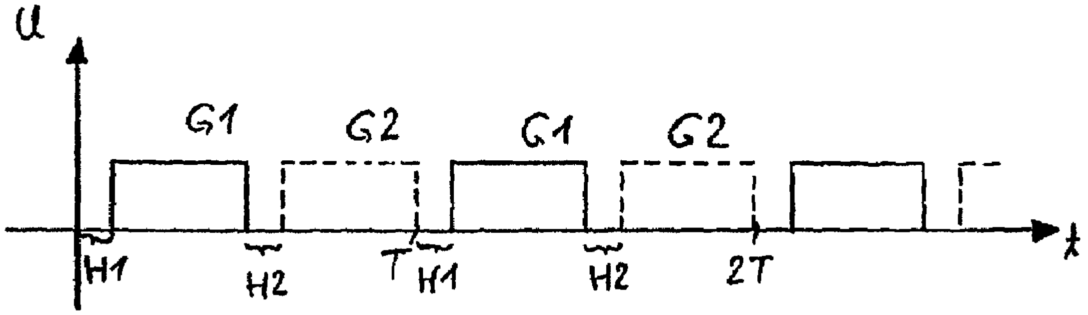
FIG. 3 illustrates the paths of the pulse widths and dead times close to the zero passage in one embodiment, without modification.

FIG. 3 shows the pulse widths G1 and G2, as well as the dead times H1 and H2 of transistors $T_1$ and $T_2$ according to FIG. 2 at a time close to or at the zero passage. This makes it clear that both the pulse widths G1 and G2 last the same amount of time. In addition, the intermediate dead times H1 and H2 are also of equal length at this time.

Figure 4:
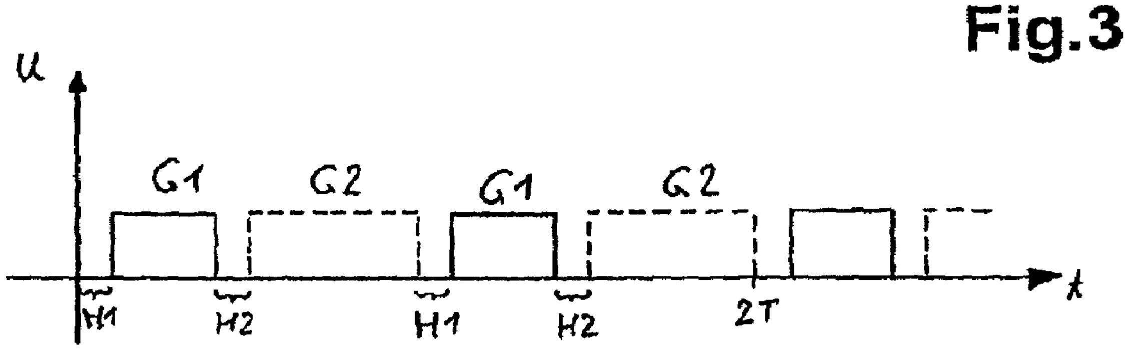
FIG. 4 illustrates the paths similar to FIG. 3 close to the high point of a half-wave with modified pulse widths.

In accordance with the aforementioned, first embodiment of the invention in FIG. 4, the pulse widths are modified. This means that for the same dead times H1 and H2 the pulse widths at transistor $T_1$, i.e. G1, have become shorter and are in fact shortened by approximately 25% close to the high point of a network half-wave. The pulse widths G2 at transistor $T_2$ are lengthened by approximately 25%. As a result of these different pulse widths, the power level at the induction coil is reduced somewhat for an unchanged operating frequency f. As can be gathered from FIG. 6, the change to the pulse widths G1 is once again a sinusoidal curve or has a sinusoidal path. The minimum pulse width G1 is at the middle or high point of a network half-wave. The not shown path G2 is obtained on reflecting the path for G1 on a line which runs horizontally through the maximum values for G1 in such a way that the sum (G1+G2) is always constant.

Figure 5:
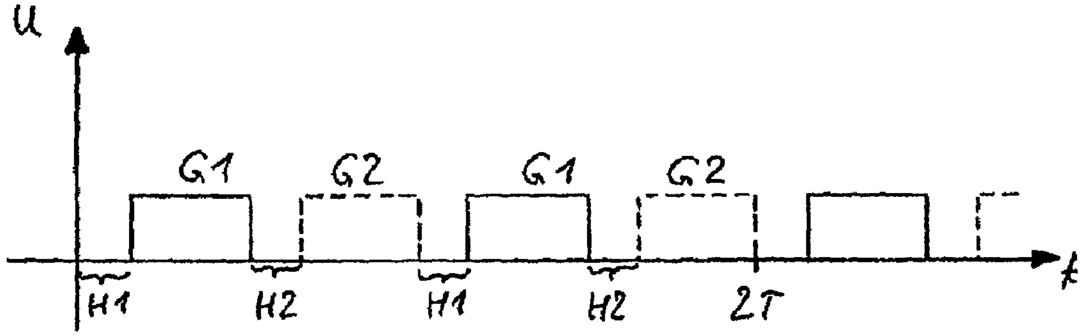
FIG. 5 illustrates the paths similar to FIG. 3 close to the high point of a half-wave with modified dead times.

In accordance with the second embodiment of the invention, FIG. 5 shows that, diverging from FIG. 4, admittedly the pulse widths G1 and G2 remain the same, but the dead times H1 and H2 between them are changed. The dead times H1 and H2, i.e. prior to the given pulse width G1 and G2, are lengthened by approximately 60% compared with FIG. 3. Here again the diagrammatic path for H1 can be gathered from FIG. 6 and is the same for H2.

Figure 6:
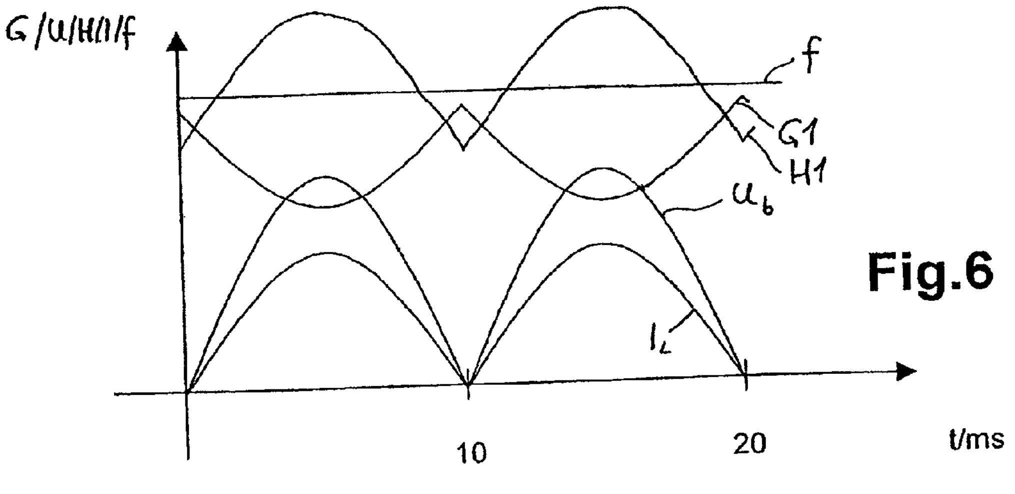
FIG. 6 illustrates the time variations of the impedance of the induction coil, the operating voltage, the inductor current amplitude, the pulse widths and the dead times according to one embodiment of the invention.

Also, with this method of modifying the dead times H, for a constant operating frequency it is possible to achieve a more sinusoidal or precisely sinusoidal power consumption $I_L$ and this effect can also be gathered from FIG. 6.

It is obvious that also both embodiment of the invention can be jointly used. In both cases, the change to the pulse width or dead time over a network or mains voltage half-wave should take place in an analogous or mirror symmetrical manner or in small steps. Thus, on the one hand it is possible to reduce or prevent the formation of harmonics and on the other it is possible to avoid noise generation by power level jumps which occur.

As stated hereinbefore, there is no need for a regulation of the pulse width G and dead time H and this can be carried solely with a control device, as a result of which costs can be kept low.

The invention claimed is:

1. A method for operating a power supply of an induction heating device having an alternating supply voltage and a frequency converter with first and second switching means provided for said power supply, wherein an operating frequency of said switching means or said frequency converter remains the same during a half-wave of said supply voltage, wherein a pulse width of a control device controlling said switching means is modified during said half-wave such that during a first half of said half-wave a pulse width or an on-time of said first switching means is made shorter and a pulse width or an on-time of said second switching means is made longer, wherein said pulse widths or said on-times of said first and second switching means are of equal length during a second half said half wave.

2. The method according to claim 1, wherein a change to said pulse width of said first switching means from said first half to said second half of said half wave is a maximum of 10% to 40%.

3. The method according to claim 1, wherein a plurality of dead times between said pulse widths of said first and second switching means during said half wave remain the same.

4. The method according to claim 3, wherein a sum of said pulse widths of said first and second switching means remains the same.

5. The method according to claim 1, wherein a change to said on-times, said dead times, or said pulse widths of said first and second switching means takes place without regulating and solely by controlling said pulse width of said control device.

6. The method according to claim 1, wherein a change to said pulse width, said on-time or said dead time takes place uniformly in distributed manner over said half-wave of said supply voltage.

7. A method for operating a power supply of an induction heating device, receiving an alternating supply voltage, said power supply having a frequency converter with a switching means comprising a first and second switching means each generating a plurality of pulses of equal pulse width, wherein an operating frequency of said switching means or said frequency converter remains the same during a half-wave of said supply voltage, wherein said pulse width of said plurality of pulses are shortened with longer dead times between them, none of said switching means being controlled during said dead times.

8. The method according to claim 7, wherein said pulse width of said plurality of pulses of said switching means are shortened during a first half of said half-wave and then said width of said plurality of pulses are lengthened during a second half of said half-wave.

9. The method according to claim 7, wherein a change to said dead times from said first half to said second half of said half wave is a maximum of 10% to 100%.

10. The method according to claim 7, wherein a change to said dead times from said first half to said second half of said half wave is a maximum of 80%.

11. The method according to claim 7, wherein a change to said on-times, said dead times or said pulse widths of said switching means takes place without regulating and solely by controlling a pulse width of a controller.

12. The method according to claim 7, wherein a change to said pulse width, said on-time or said dead time takes place uniformly in distributed manner over said half-wave.

13. A power supply of an induction heating device comprising:

- a frequency converter having a resonant circuit with an induction coil;
- a resonant circuit capacitor and a half-bridge with a switchable switching means; and
- a control device configured to control the switching means at an operating frequency, wherein the control device is configured to modify the pulse widths or dead times in such a way to produce a constant operating frequency wherein at one pulse width is shortened or one dead time lengthened during a half cycle of an input supply voltage frequency.

* * * * *